(12) United States Patent
Schaefer (10) Patent No.: US 7,809,467 B2
(45) Date of Patent: Oct. 5, 2010

(54) SYSTEM AND METHOD FOR ORDER PICKING OF ARTICLES INTO ORDER CONTAINERS

(75) Inventor: Gerhard Schaefer, Neunkirchen (DE)

(73) Assignee: SSI Schaefer Peem GmbH, Graz (AT)

( * ) Notice: Subject to any disclaimer, the term of this patent is extended or adjusted under 35 U.S.C. 154(b) by 468 days.

(21) Appl. No.: 11/351,264

(22) Filed: Feb. 10, 2006

(65) Prior Publication Data

US 2006/0229762 A1 Oct. 12, 2006

Related U.S. Application Data

(63) Continuation of application No. PCT/EP2005/000824, filed on Jan. 28, 2005.

(30) Foreign Application Priority Data

Mar. 17, 2004 (DE) ............ 10 2004 014 378

(51) Int. Cl.
G06F 7/00 (2006.01)
(52) U.S. Cl. ............ 700/216; 700/230
(58) Field of Classification Search ............ 700/215, 700/213, 216, 230, 228
See application file for complete search history.

(56) References Cited

U.S. PATENT DOCUMENTS

| | | | |
|---|---|---|---|
| 5,983,648 A | 11/1999 | Morchen | |
| 6,208,908 B1* | 3/2001 | Boyd et al. | 700/216 |
| 6,597,969 B2* | 7/2003 | Greenwald et al. | 700/216 |
| 2002/0087231 A1* | 7/2002 | Lewis et al. | 700/230 |
| 2004/0225406 A1* | 11/2004 | Rovers | 700/213 |
| 2004/0249497 A1* | 12/2004 | Saigh et al. | 700/216 |
| 2006/0025884 A1* | 2/2006 | Henkel | 700/216 |

FOREIGN PATENT DOCUMENTS

| | | |
|---|---|---|
| DE | 42 25 041 A1 | 2/1994 |
| DE | 298 06 960 U1 | 9/1998 |
| EP | 0 515 350 A | 11/1992 |
| FR | 2 603 260 A | 3/1988 |
| JP | 04 116001 A | 4/1992 |

* cited by examiner

Primary Examiner—Gene Crawford
Assistant Examiner—Ramya Prakasam
(74) Attorney, Agent, or Firm—McNeely & Hare LLP; Kevin J. McNeely (57) ABSTRACT

Herein, a picking system and method for picking articles into order containers is disclosed, the system having a picking station which includes in at least one picking bucket, wherein first conveying means are arranged such that articles to be picked, which are picked via the picking buckets directly onto the first conveying means, can be conveyed into an order container associated with a picking order.

19 Claims, 7 Drawing Sheets

SYSTEM AND METHOD FOR ORDER PICKING OF ARTICLES INTO ORDER CONTAINERS

RELATED APPLICATIONS

This is a continuation application of co-pending International Patent Application PCT/EP 2005/000824 which claims priority of the German application DE 10 2004 014 378.1 filed on Mar. 17, 2004 which is fully incorporated by reference herewith.

BACKGROUND OF THE INVENTION

The present invention relates to an order-picking system for picking articles into order containers according to an order comprising an order-picking station which comprises at least one picking bucket.

The present invention further relates to an order-picking method wherein articles are picked at a picking station via at least one picking bucket into order containers in which the articles to be picked can be collected.

RELATED PRIOR ART

Such a system and such a method are generally known.

Further, picking systems, and particularly picking stations, are known at which so-called order containers can be filled with handable goods. An order container is a container into which handable goods and articles, respectively, are picked. Usually, the picking happens according to so-called picking orders. A picking order can include several different articles which are to be picked according to the picking order into one and the same order container. Each order container is associated at least with one picking order.

Conventionally, the actual picking process happens at so-called picking stations. An area is referred to as a picking station at which a picking person picks articles into provided order containers according to the above-mentioned picking orders. At the same time, the articles to be picked are transported to the picking station in so-called storage containers. A storage container is a container in which articles to be picked are stored. This storing usually occurs with only one sort. With only one sort means that a single-storage container contains only one single type of article respectively. However, the storage containers can be divided such that different types of articles can be stored within one and the same storage container.

The storage containers are stored in, for example, so-called shelf storages. A shelf storage comprises a plurality of shelves or racks. The storage containers are stored in the shelves. Therefore, each shelf has a plurality of storage places.

For the sake of storing and/or retrieving storage containers, among other things, so-called stacker cranes (SC) or storage and retrieval devices (SRD) are used. SCs and SRDs can be automatically controlled by a controlling unit such as a central host computer being superordinated to the picking system. It takes care for the transfer of the storage containers between the storage and the picking place/places. When the distance between the storage and the picking place is high conveying tracks can be used such as roll tracks, belts, hanging carriers and the like. Such so-called storage-container conveying tracks transport the storage containers to the picking station.

Such a picking system allows realization of the picking principle called "goods-to-man". According to the "goods-to-man" principle the articles to be picked are directly transported to the picking person. Thus, the picking person can substantially stay stationary at the picking station and does not need to go long ways for picking.

The "goods-to-man" principle is to be judged extremely positive from an ergonomical point of view. Nowadays, ergonomics plays a more and more significant role in legislation such that current picking systems are facing most severe ergonomic requirements. However, this often requires considerable logistic efforts with respect to the transportation of the storage containers and order containers.

The planning of the picking processes in a system of the type as mentioned above is extremely complex. For example, it must be planned in advance which storage container is to be transported at which time to which picking station in order to allow the complete processing of a picking order.

So-called picking buckets are known devices for reducing this effort and for allowing the picking processes to become more efficient, i.e. for example faster. A picking bucket is a type of container which is usually provided at the picking station within a picking person's reach of arms. The picking person picks articles from above into an upper open opening of the picking bucket. At a lower end of the picking bucket another closable opening is provided through which the articles, which are located within the picking bucket, can be released into an order container which is arranged beneath the picking bucket. A picking station having such a picking bucket will be described in more detail below.

It is to be noted that the known picking systems have the disadvantage insofar as picking orders, as a general rule, have to be completely processed at one single picking station if articles to be picked are picked into order containers. Thus, congestions can occur in the overall system if only one single article which is needed for completion of a picking order is lacking.

In order to increase the flexibility of the overall system it is known to not pick the order containers completely at one single picking station. They are only picked partially. However, the transport of partially-picked order containers from one picking station to another picking station is time-consuming, requires additional order-container conveying tracks, and, therefore, is expensive, low efficient, and very intense with respect to planning.

Further, installation of additional order-container conveying tracks causes expensive material involved and high work effort.

SUMMARY OF THE INVENTION

Therefore, it is an object of the present invention to provide a system and method for picking articles into order containers which is efficient and keeps the costs within a manageable frame.

This object is achieved by a picking system as mentioned at the outset, wherein first conveying means are arranged such that articles, which are associated with a picking order, can be conveyed directly via the picking bucket onto the first conveying means into an order container being associated with the picking order.

This object is also achieved by a picking method as mentioned at the outset which includes the following steps: emptying the picking bucket directly onto first conveying means; transporting the emptied articles towards an order container; and handing over the articles to the order container.

Thus, the present invention de-couples the handing over of articles to be picked at the intersection between picking station and order container. By picking the articles to be picked at first onto first conveying means, before they are conveyed subsequently into order containers, the order-container conveying track does not need to be arranged directly within the region of the picking station. The partial picking at a picking station is facilitated.

The articles to be picked are directly picked via a bucket onto the first conveying means. These articles, which either have been picked partially or completely in accordance with a picking order, are orderly transported to a corresponding order container.

Since the order containers, therefore, do not absolutely have to pass the picking station, considerable portions of the order-container conveying track can be saved. The arrangement of the order-container conveying track, which is often quite complicated, becomes unnecessary at the location of the picking station. The picking station in total requires less space.

Picking orders can be distributed over several picking stations which preferably are arranged parallely to each other and sequentially relative to the order-container conveying track. The entire system becomes more dynamic. The planning becomes more flexible. The above-mentioned decoupling increases the efficiency of the system.

The picking velocity at the picking station can be remarkably enhanced since one does not need to wait until an order container is completely picked in order to be allowed to be transported away, or until the "proper" order container is at the picking station, in order to process a picking order.

In accordance with a preferred embodiment of the invention the first conveying means comprise means for safe transport.

For example, using bars as means for safe transport is advantageous since these bars prevent a mixing of the articles on the first conveying means. Articles which come easily into a rolling state can be prevented from rolling from one region of the first conveying means, which is associated with a predetermined order container, into another region, which is associated with another order container. This is particularly important if the first conveying means are moved at a relatively high velocity such that, for example, inertia effects which can occur upon the release of the articles from the "static" picking buckets onto the moving first conveying means are to be taken into consideration.

Further, due to the means of safe transport one can control whether the articles being picked onto the first conveying means have been picked correctly by controlling the articles via a control device such as a video camera on the first conveying means by means of image detection and subsequent comparison. The control device can be arranged at an arbitrary location between the picking station and a handing-over point at which the article from the first conveying means are handed over into waiting order containers, for example perpendicularly above the first conveying means.

Further, it is preferred when a plurality of picking stations is provided and second conveying means are arranged such that articles are collected from respective first conveying means of the plurality of picking stations directly onto the second conveying means in order to convey the articles, collected in accordance with one single picking order, to an order container being associated with that picking order.

In this manner, an even better decoupling becomes possible. The length of the order-container conveying track can be reduced further since the articles of the first conveying means respectively are collected first by means of the second collecting means in order to hand them over to the order-container conveying track or to the order containers.

Another particular advantage is when the order containers are conveyable by means of an order-container conveying track to or from a handing-over point, wherein the handing-over point is located at an intersection between the first conveying means or the second conveying means, and the order-container conveying track.

In accordance with another preferred embodiment the conveying means comprise an endless-rotating conveying track, particularly a belt.

By using an endless-rotating conveying track high transport velocities can be achieved. The installation: of an endless-rotating conveying track is cheap, saves space, and can be handled fast. The maintenance effort for belts is smaller than for roll tracks.

Another advantage is when the articles, which are to be picked and are located within storage containers, can be transported to the picking station by means of a storage-container conveying track.

Providing a storage-container conveying track allows realization of high transport velocities. The picking person does not need to bring the storage containers to the picking station himself/herself and to walk along the shelf storage, respectively, to reach the content of the storage containers.

Another advantageous measure is when at the picking station further a light element is provided for visually indicating a source location and/or a destination of articles to be picked, as well as a display element is provided which indicates visually a number of articles to be picked.

By using a light element, the location of articles within a storage container, from which the articles which are to be picked can be taken, can be localized exactly. The picking person can immediately realize from which region of the storage container an article is to be picked. This is particularly advantageous when the storage container itself is divided into several regions so that several types of articles are stored within one and the same storage container.

Something similar applies for illumination of the picking bucket, particularly if several picking buckets are arranged at the picking station. By the aid of the light elements the picking person is unambiguously indicated into which picking bucket of the plurality of picking buckets the article, which has just to be picked, has to be put.

By the aid of the display element the picking person gets indicated the number of the articles to be picked in a reliable and fast manner simultaneously. These measures support the efficiency of the picking system. Also, the error rate is reduced by these measures.

It will be appreciated that the features mentioned above and those still to be explained below can be used not only in the respectively specified combination but also in other combinations or on their own without departing from the scope of the present invention.

Exemplary embodiments of the invention are illustrated in the drawings and will be explained in more detail in the following description.

DESCRIPTION OF PREFERRED EMBODIMENTS

In the following same features will be designated by the same reference numerals. In the context of the present invention a picking station will always be designated by the reference numeral 10.

Figure 1:
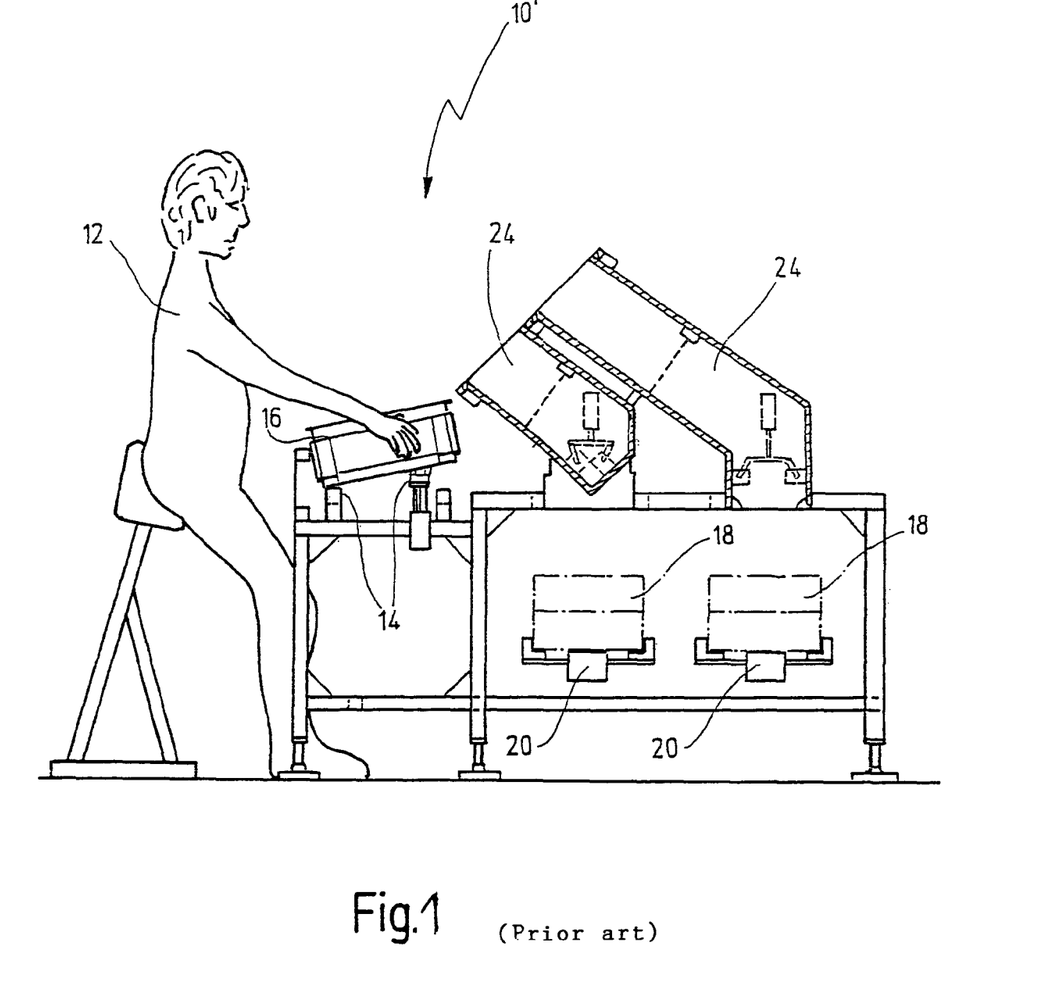
FIG. 1 is a schematic side view of a picking station according to the prior art.

In FIG. 1 a picking station 10' according to the prior art is shown. The picking station 10' is operated by a picking person 12. Storage containers 16 are transported to the picking person 12 via a storage-container conveying track 14. Order containers 18 are transported to the picking station 10' by means of an order-container conveying track 20. The conveying tracks 14 and 20 can be of the roll track type.

Between the order containers 18 and storage containers 16 one or more picking buckets 24 can be arranged. In FIG. 1, two picking buckets 24 are shown. The picking buckets 24 respectively comprise a mechanism at its lower ends by which a bottom of each picking bucket 24 can be opened and closed. The picking bucket 24, which in FIG. 1 is arranged closer to the picking person 12, is depicted in a closed state. The other picking bucket 24 is depicted in an open state.

In the following, a conventional picking process will be described.

Articles (not shown) which are to be picked are transported in storage containers 16 via the storage-container conveying track 14 to the picking station 10. Empty order containers 18 are positioned beneath the picking buckets 24 by the order-container conveying track 20. The picking person 12 takes out articles to be picked from the storage containers 16 and puts them according to a corresponding picking order into one or both picking buckets 24. The picking buckets 24 are in its closed state, for the time being. When all articles to be picked are taken from the storage container 16, this storage container 16 is transported away from the picking station 10', and a new other storage container 16 having other articles is transported to the picking station 10'. The picking person 12 can take another article and put it in one of the picking buckets 24. This process repeats so often until a picking order is completely processed.

If a picking order is completely processed all articles, which belong to this picking order, are within one of the picking buckets 24. In such a case the lower end of this picking bucket 24 is opened and releases the articles. Then, the articles fall into the empty order container 18 which is provided beneath the lower end of the picking bucket 24. The so filled order container 18 is then transported away using the order-container conveying track 20, and a new other order container 18 is brought to the place of the order container 18 being transported away.

Of course, it is also possible to process picking orders only partially. The only partially-processed order containers 18 are then transported to another picking station 10 by the order-container conveying track 20 where they are further processed or finally processed.

Figure 2:
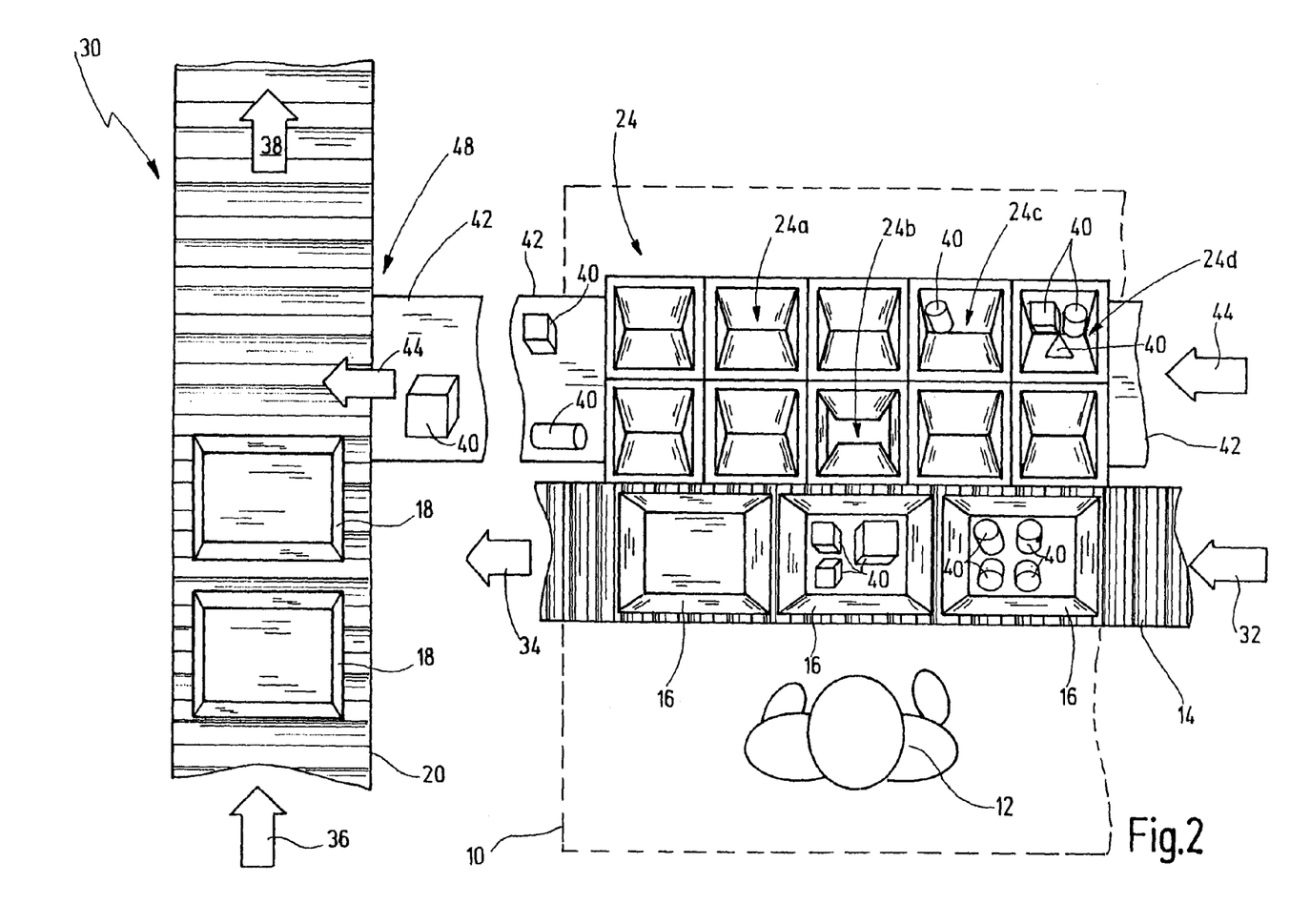
FIG. 2 is a schematic elevation view on a picking system according to the present invention.

FIG. 2 shows a schematic elevation view on a first embodiment of a picking system 30 according to the present invention.

A similar picking station 10 as shown in FIG. 1 is provided, which is operated by a picking person 12. Via an order-container conveying track 20 order containers 18 are delivered to the picking system 30 (cf. arrow 36) and retrieved therefrom (cf. arrow 38). However, this transport does not happen directly into the picking station 10 or past it. Storage containers 16 are transported directly to and retrieved from the picking station 10 (cf. arrows 32, 34) by a storage-container conveying track 14 which can be, for example, a roll track 14.

Further, ten picking buckets 24 are depicted exemplarily in FIG. 2. However, more or less picking buckets 24 can be provided. The picking buckets 24 are arranged in two stacked rows each having five picking buckets 24.

The reference numeral 24a designates an empty and closed picking bucket. Reference numeral 24b designates an empty and opened picking bucket. The reference numeral 24c designates a closed picking bucket in which an article 40 is located, the article being, for example, formed cylindrically. The reference numeral 24d designates another picking bucket which has several articles 40.

Empty order containers 18 are transported off by an order-container conveying track 20. However, the empty order containers 18 are not transported beneath the picking buckets 24, as it is known in the prior art. For example, beneath the picking buckets 24 is arranged a conveying track 42 which conveys along the direction of an arrow 44. Preferably, the conveying track 42 is an endless-rotating belt. The belt 42 conveys articles 40 from the picking station 10 or from the picking buckets 24 to the order-container conveying track 20. An intersection or a handing-over point between the belt 42 and the order-container conveying track 20 will be designated by reference numeral 48.

In the following a picking process in the picking system 30 according to the present invention will be discussed.

The picking person 12 takes articles 40 out of storage containers 16 and puts them into one of the picking buckets 24 which is predetermined according to a corresponding picking order. When all articles 40, which are required for the processing of the picking order, are located within this picking bucket 24, or when all articles 40, which are required for the processing of a partial-picking order, then the picking bucket is opened and releases these articles 40 downwards. The articles 40 fall onto the belt 42 and are conveyed along a direction 44 from the picking station 10 towards the handing-over point 48.

Simultaneously or in advance, an empty order container 18 is conveyed to the handing-over point 48, for example via a roll track 20.

The articles 40 which have fallen on the belt 42 are transported to the end of the belt 42 where they subsequently fall into the empty order container 18 provided.

However, it is not absolutely necessary that the order container 18 is completely empty. It is also possible that the order container 18 has already been pre-picked, i.e. part of the picking order for this order container has already been pre-picked at another (not shown) picking station 10. Such a proceeding will be discussed in more detail in conjunction with FIGS. 4 and 7.

Figure 3:
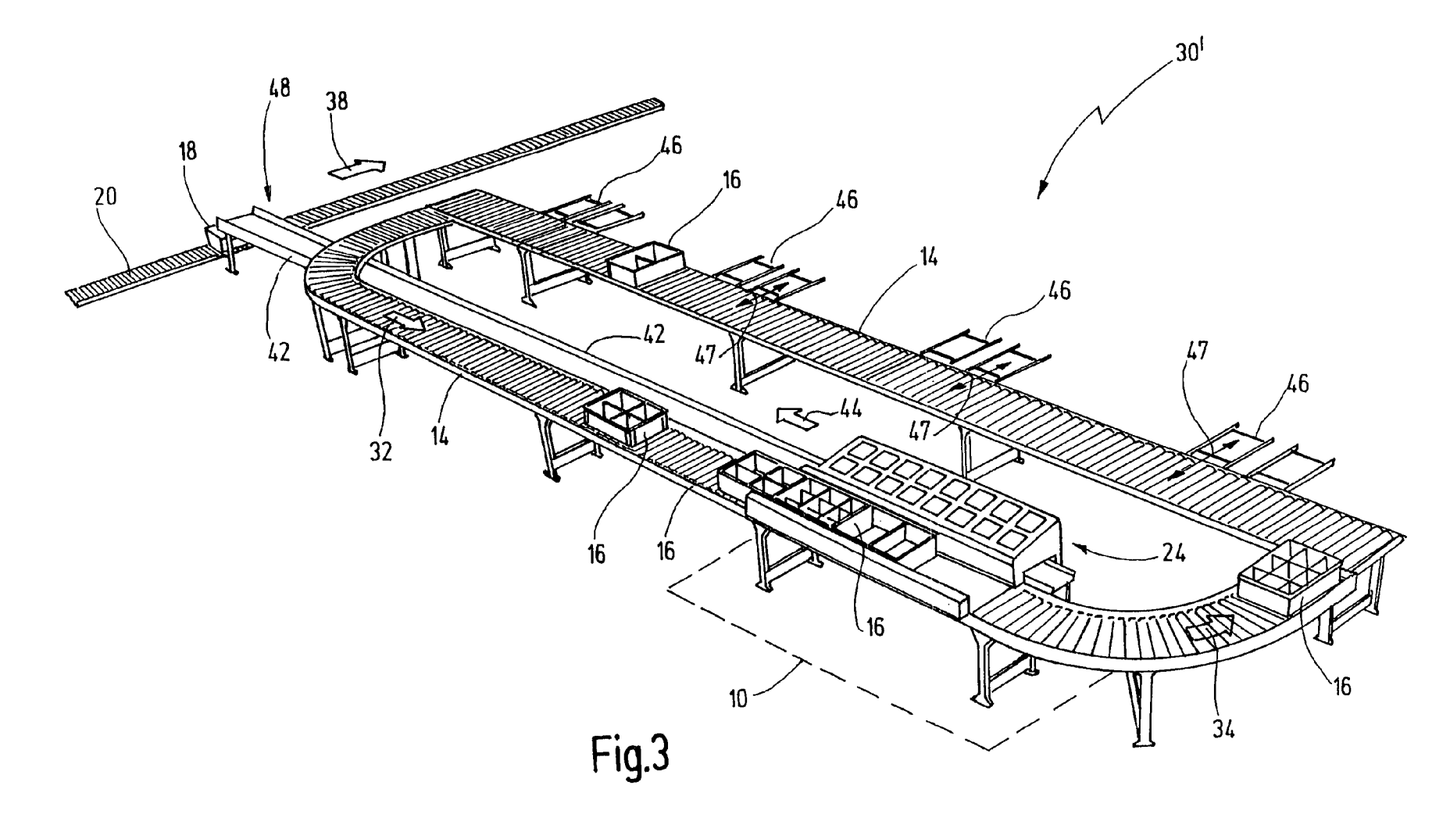
FIG. 3 is a perspective view of the picking system according to FIG. 2.

The conveying tracks 14 and 20 depicted in FIG. 2 each are depicted sectionally. FIG. 3 gives a better spatial impression.

FIG. 3 schematically shows a perspective view of a part of a picking system 30' according to the present invention.

The arrangement shown in FIG. 3 is nearly the same as the one shown in FIG. 2. The picking system 30' of FIG. 3 distinguishes from the picking system 30 of FIG. 2 in that here in total 16 instead of only 10 picking buckets 24 are provided. Also, the transport directions 32 and 34 of the storage container 16 are reversed. However, the transport directions 36 and 38, respectively, of the order containers 18 have been maintained.

It is to be noted that in the picking system 30' of FIG. 3 the storage-container conveying track 14 has the shape of a closed loop. Further, several terminals 46 are depicted at a section of the order-container conveying track 14 being arranged oppositely to the picking station 10. The terminals 46 connect the order-container conveying track 14 to a storage shelf area (not depicted). Between the terminal 46 and the storage-container conveying track 14 means for injecting-in and steering-out the storage container 16 are provided, by the aid of which the storage container 16 can be moved in the direction of double arrow 47. In this manner, storage container 16 can be retrieved from the storage or given back into the storage.

Figure 4:
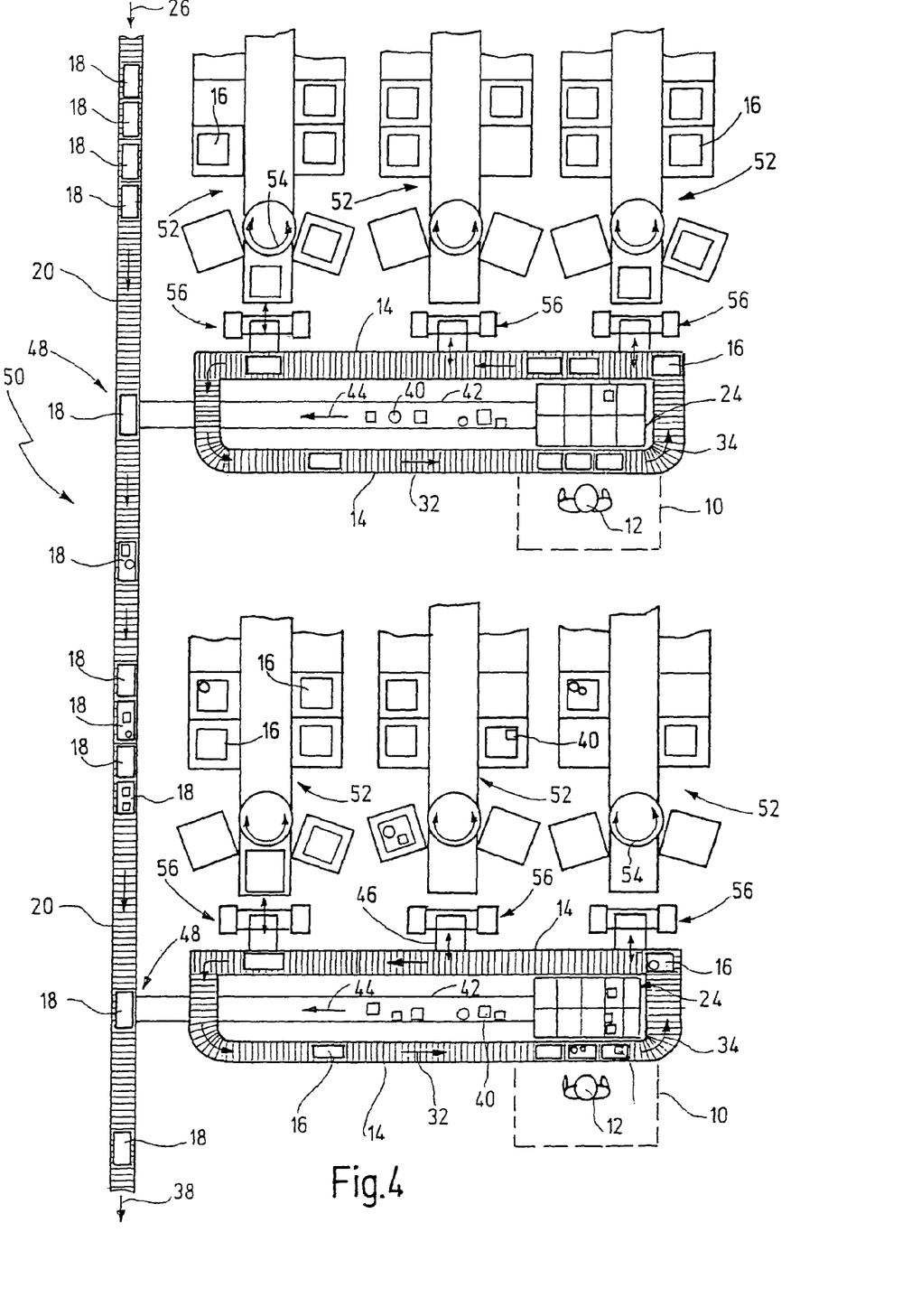
FIG. 4 is a schematic elevation view on another embodiment of the present invention, wherein the picking system has several picking stations.

In FIG. 4 another embodiment of a picking system 50 according to the present invention is shown.

The picking system 50 is assembled similarly as the one of FIG. 3. The portion being depicted in FIG. 3 is illustrated double in FIG. 4. FIG. 4 shows a schematic elevation view on the picking system 50.

In FIG. 4, also so-called carousel storages 52 are illustrated exemplarily. Other types of shelves can be used such as high bay shelves having SRDs.

The carousel storages 52 are arranged such that they can interact with the terminal 46 by exchanging storage containers 16. The carousel storages 52 consist of stacked rows of storage places for storage containers 16. The carousel storages 52 can be turned in both directions, clockwise and counter-clockwise in the drawing plane of FIG. 3, as it is indicated by an arrow 54. A vertical elevator 56 can be arranged at the front side of the carousel storages 52 for retrieving storage containers 16 from different heights of the respective shelves or giving them away there.

Full containers are illustrated dark in FIG. 4. Empty containers are illustrated light in FIG. 4. Partially-filled containers are depicted to have articles 40.

It is to be noted that the picking system 50 comprises two picking stations 10 each of which can be operated by a picking person 12. In the manner explained above, articles 40 are put onto the belt 42. The belt 42 of each of the picking stations 10 conveys picked articles 40 towards an order-container conveying track 20, which is depicted at the left-hand side edge in FIG. 4.

In FIG. 4, the feeding 36 of empty order containers 18 happens from above. The order containers 18 are conveyed downwards along the direction of the arrow 38. On its conveying path, the order containers 18 pass two handing-over points 48 in FIG. 4. However, picking systems having more picking stations and more handing-over points can also be constructed.

A first handing-over point 48 is passed by the order containers 18 in the heights of the upper picking station 10. Then, a second handing-over point 48 is passed which is in the height of the lower picking station 10. At the first handing-over point, articles 40 which are located on the belt 42 of the upper picking station 10, can, preferably, be given into an empty order container 18. Such an order container 18 can be picked either completely or partially. For example, the storage container 18 which is shown beneath the first handing-over point 48 has been picked only partially, and is to be picked completely at the second handing-over point 48. The order container 18 which is positioned in front thereof, with respect to the transport direction, already has been completely picked at the upper picking station 10. However, it is also possible to convey an order container 18 past the first handing-over point 48 without giving articles 40 into it. Such a completely empty order container 18 is shown in FIG. 4 at the second lower handing-over point 48 which is located in the height of the second picking station 10.

Figure 5:
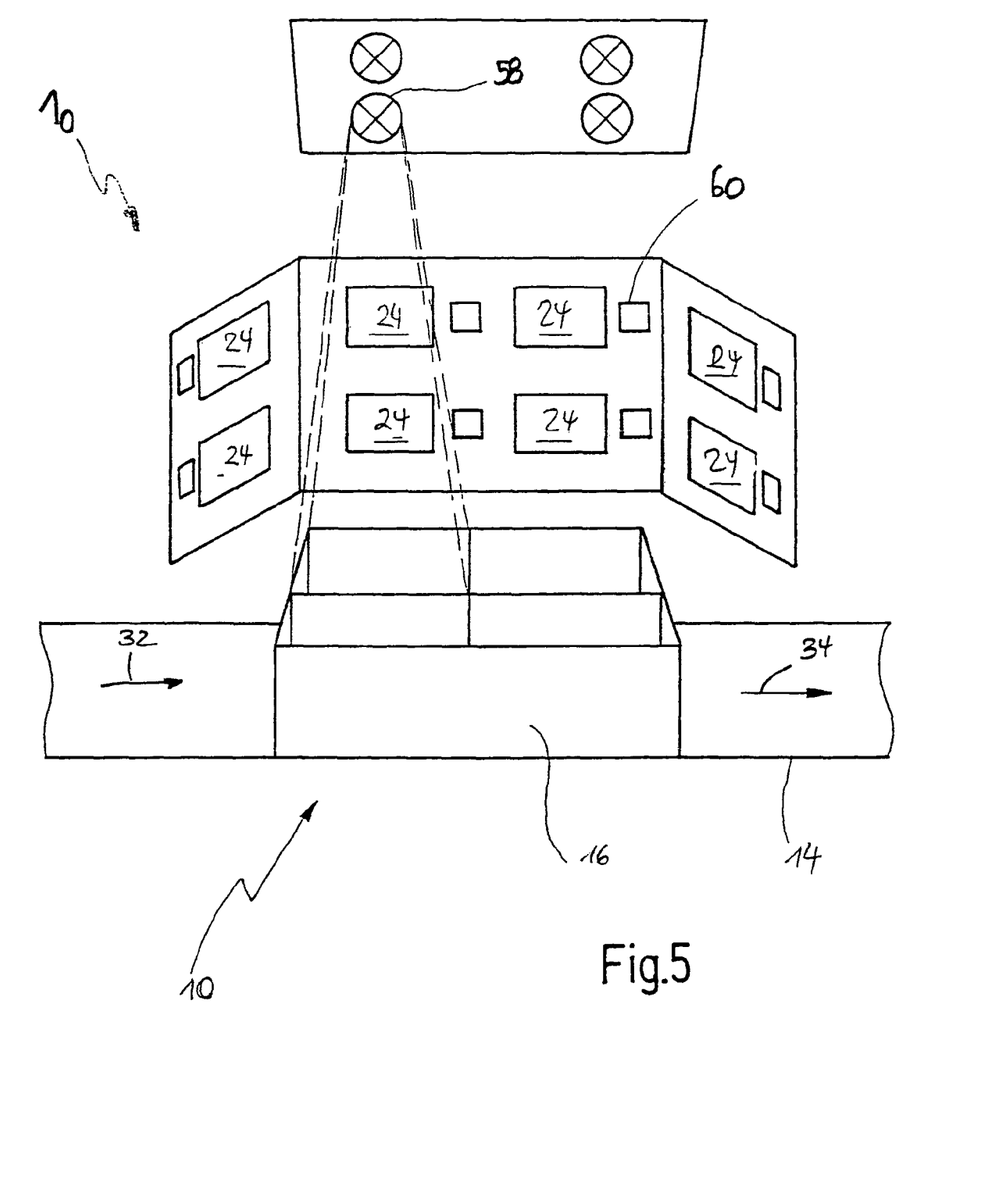
FIG. 5 shows a light element and a display element as they are used at picking stations which are part of the picking system according to the present invention.

In FIG. 5, a schematic view of a portion of the picking station 10 according to the present invention is shown.

In FIG. 5, a storage container 16, which is divided internally, is fed in direction 32 by the storage-container conveying track 14. By using a light element 58 such as a laser, for example, a predetermined area of the divided storage container 16 is illuminated. In this manner, the picking person is shown from which area of the storage container 16 articles are to be taken. In this illuminated area articles 40 (not shown) are located which are to be picked.

Further, each of the picking buckets 24, wherein in FIG. 5 eight are provided, is respectively associated with a display element 60 such as a LED display. The LED display, on the one hand, indicates into which of the picking buckets 24 the articles to be picked are to be given. On the other hand, the display element 60 indicates how many articles are to be picked.

Alternatively, also one single central display element can be provided which is attached clearly visibly. This display element indicates respectively the number of the articles to be picked. Then, the buckets are provided with a lamp which indicates to the picking person, upon operation, into which of the buckets the picking person must pick.

Figure 6:
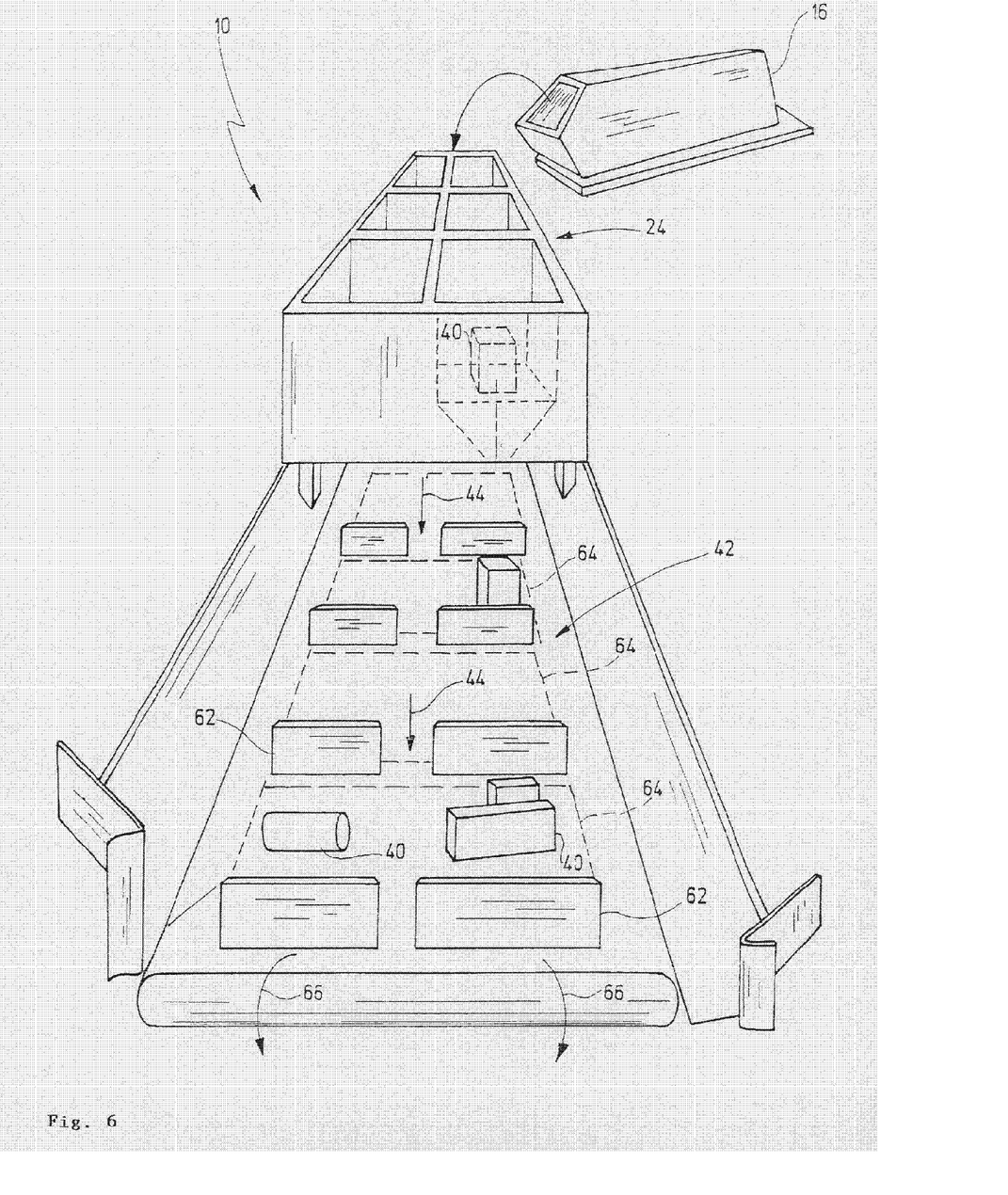
FIG. 6 is a schematic and perspective view of a picking station, and particularly of the first conveying means according to the present invention.

FIG. 6 shows another perspective and schematic view of a picking station 10 according to the present invention, viewing on the picking station 10 along a longitudinal axis of the belt 42.

Provided at the belt 42 are subdivisions such as bars 62 dividing the belt 42 into sections 64.

Since the belt 42, as a general rule, rotates endlessly at a constant velocity, it may happen that articles 40 upon release by the picking bucket 24 fall onto the belt 42 and due to its inertia slide oppositely to the moving direction of the belt on the moving belt 42.

In order to prevent articles 40 from sliding too far on the belt 42, the belt 42 is fixedly divided into predefined sections 64, for example, by bars 62. The sections 64, in turn, can be associated respectively with one order container 18.

Further, an order container 18 remains at a handing-over point 48 (not depicted, cf. FIGS. 2 to 4) until all articles 40 which are provided for it are fallen into this order container 18 along the direction of arrows 66.

Additionally, the bars 62 are an optically detectable limitation by means of which a control can be performed. For example, a video camera can be installed (not depicted) above an area of the belt 42 which is freely viewable and disposed after the picking buckets 24 with respect to the conveying direction 44 of the belt 42. This video camera can detect instantaneous images of the sections 64. These images are evaluated for determining whether the correct article 40 is within the section 64.

Each section 64 can be associated with a predetermined order container 18, as explained above. Each order container 18, in turn, is associated with a picking order. In this manner, a check can be performed whether a picking order has been carried out correctly.

Figure 7:
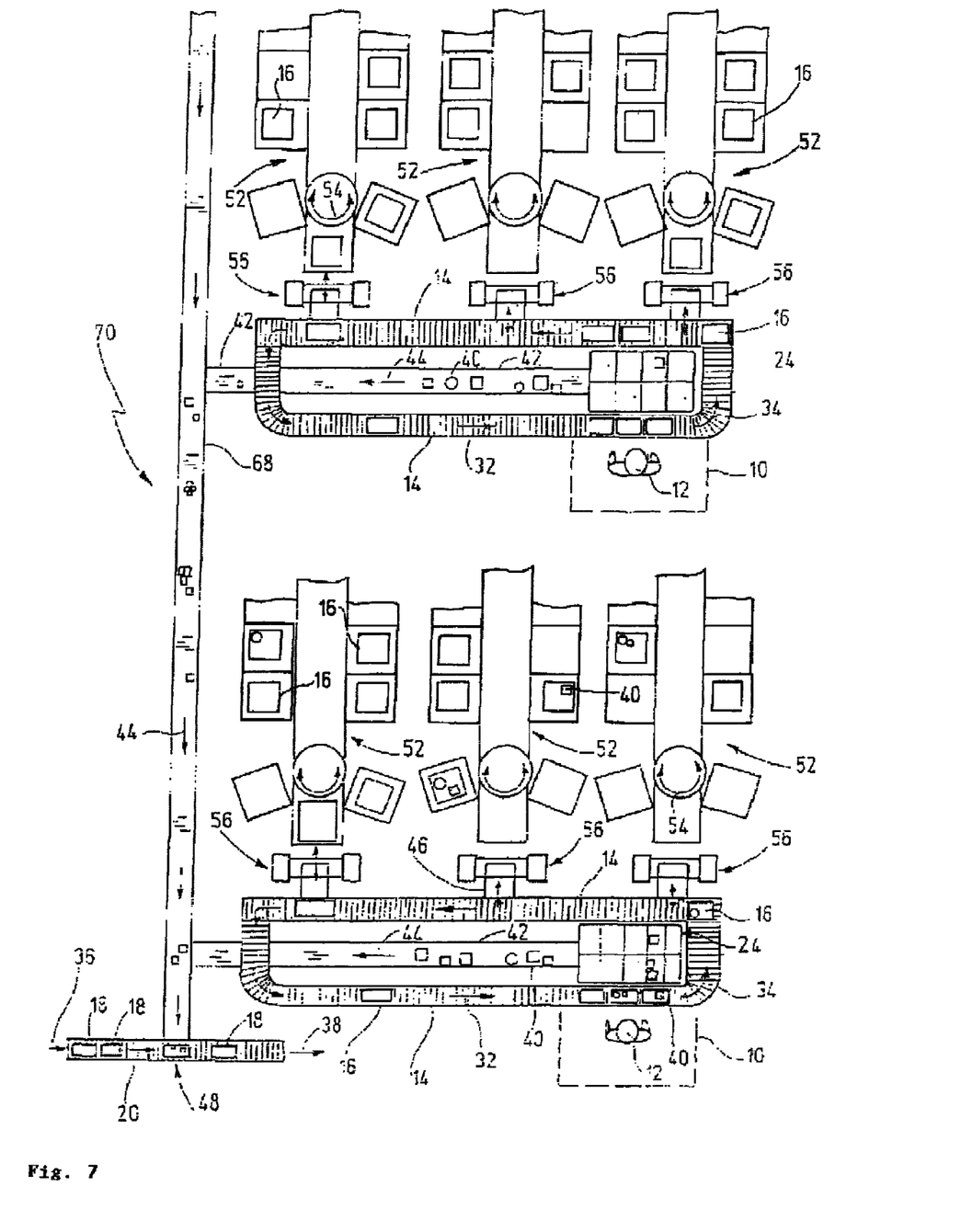
FIG. 7 shows another embodiment of the present invention similar to that embodiment as shown in FIG. 4.

In FIG. 7, another embodiment of a picking system 70 according to the present invention is shown.

The picking system 70 of FIG. 7 is similarly formed as the picking system 50 of FIG. 4. It distinguishes from the picking system 50 in that the belts 42 do not convey the articles 40 directly into order containers 18 but onto another belt 68.

This other belt 68, in turn, conveys the articles 40 disposed thereon to a handing-over point 48 at which the order containers 18 are provided for picking.

It is clear that several stages of belts can be connected subsequently for bringing together more portions of a picking order.

The conveying means, which are described in the above embodiments, can be replaced by any conveying means known in the art. The same applies with respect to the shelves of the shelf storage. Instead of carousel shelves high bay shelves could be used which, for example, are arranged in lanes, wherein the SRDs, which guarantee the transfer of the storage containers, move within the lanes.

Also, several picking stations can be provided at one and the same belt for simultaneously processing picking orders at Therefore, what is claimed, is:

1. A picking system for picking articles from one or more storage containers into order containers, the picking system comprising:
   a picking station having at least one picking bucket to be operated by a picking person;
   a storage-container conveying track to convey the storage containers, wherein the articles to be picked are conveyed in the storage containers directly to the picking station by the storage-container conveying track;
   an order-container conveying track;
   a handing-over point, wherein the order containers are conveyed to and from the handing-over point by means of the order-container conveying track, the handing-over point being located at an intersection between the first conveyor and the order-container conveying track; and
   a first conveyor, wherein the picking station and the first conveyor are arranged such that articles, associated with a picking order, can be released from the picking bucket directly onto the first conveyor, and subsequently drop from the first conveyor into an order container associated with the picking order.

2. The picking system of claim 1, wherein the first conveyor comprises means for dividing the first conveyor into a plurality of sections.

3. The picking system of claim 2, wherein each picking bucket is associated with one single section of the plurality of sections.

4. The picking system of claim 2, wherein the first conveyor is divided into the plurality of sections by one or more bars, the bars being attached to the first conveyor.

5. The picking system of claim 1, wherein the picking system comprises a plurality of picking stations and a second conveyor, the second conveyor being arranged such that the articles are collected directly onto the second conveyor from the first conveyor of the plurality of picking stations and conveyed to the order container associated with the picking order.

6. The picking system of claim 5, wherein the handing-over point is located at an intersection between the second conveyor and the order-container conveying track.

7. The picking system of claim 5, wherein the first and second conveyors comprise an endlessly-rotating conveying track.

8. The picking system of claim 7, wherein the first and second conveyors comprise a belt.

9. The picking system of claim 1, wherein the picking station comprises a light element configured to visually indicate one of a source location and a destination location of articles to be picked and a display element configured to visually indicate a number of the articles to be picked.

10. A method for picking articles into order containers from one or more storage containers at a picking station to be operated by a picking person and comprising at least one picking bucket, the method comprising the following steps:
    transporting storage containers containing articles to be picked in accordance with a picking order via a storage-container conveying track directly to the picking station;
    picking the articles from the storage containers and collecting the articles in one of the picking buckets;
    releasing the articles from the picking bucket directly onto a first conveyor, if the articles of the picking order are collected in the one bucket;
    transporting an order container, associated with the picking order, via an order-container conveying track to a handing over point which is located at an intersection between the first conveyor and the order-container conveying track;
    transporting the collected articles on the first conveyor towards the order container; and
    dropping the articles from the first conveyor into the order container on the order-container conveying track at the handing-over point.

11. The method of claim 10, wherein the first conveyor comprises means for dividing the first conveyor into a plurality of sections.

12. The method of claim 11, wherein each picking bucket is associated with one single section of the plurality of sections.

13. The method of claim 11, wherein the first conveyor is divided into the plurality of sections by one or more bars, the bars being attached to the first conveyor.

14. The method of claim 10, wherein the picking system comprises a plurality of picking stations and a second conveyor, the second conveyor being arranged such that the articles are collected directly onto the second conveyor from the first conveyor of the plurality of picking stations and conveyed to an order container associated with the picking order.

15. The method of claim 14, wherein the order containers are conveyed to and from the handing-over point by means of the order-container conveying track, the handing-over point being located at an intersection between either of the first conveyor or the second conveyor and the order-container conveying track.

16. The method of claim 10, wherein the first and second conveyors comprise an endlessly-rotating conveying track.

17. The method of claim 16, wherein the first and second conveyors comprise a belt.

18. The method of claim 10, wherein the picking station comprises a light element configured to visually indicate one of a source location and a destination location of articles to be picked, and a display element configured to visually indicate a number of the articles to be picked.

19. A picking system for picking articles from one or more storage containers into order containers, the picking system comprising:
    at least one picking bucket;
    storage containers that hold articles to be placed in the at least one picking bucket;
    a picking station where articles are manually moved from storage containers into picking buckets;
    a first conveyor arranged such that articles can be released from the at least one picking bucket to drop directly onto the first conveyor to be conveyed to a remote handing-over point;
    a second conveyor that conveys the storage containers by the picking station in a continuous loop;
    order containers to receive articles picked for an order; and
    a third conveyor to convey an order container by the handing-over point such that articles drop from the first conveyor into the order container associated with the picked order.

* * * * *